(12) United States Patent
Wong et al.

(10) Patent No.: US 8,833,341 B2
(45) Date of Patent: Sep. 16, 2014

(54) LIQUID FUEL INJECTION ENGINE

(75) Inventors: Andrew Paul Chee Aun Wong, Victoria (AU); Adam Nolan, Victoria (AU); Jamie Terence Slaymaker, Victoria (AU)

(73) Assignee: Ford Motor Company of Australia Limited, Campbellfield, Victoria (AU)

( * ) Notice: Subject to any disclaimer, the term of this patent is extended or adjusted under 35 U.S.C. 154(b) by 832 days.

(21) Appl. No.: 13/011,335

(22) Filed: Jan. 21, 2011

(65) Prior Publication Data

US 2011/0186012 A1 Aug. 4, 2011

(30) Foreign Application Priority Data

Feb. 1, 2010 (AU) ................................ 2010200354

(51) Int. Cl.
| | |
|---|---|
| *F02M 53/00* | (2006.01) |
| *F02M 31/20* | (2006.01) |
| *F02D 19/02* | (2006.01) |
| *F02M 21/02* | (2006.01) |
| *F02D 17/02* | (2006.01) |
| *F02D 41/04* | (2006.01) |
| *F02D 41/00* | (2006.01) |
| *F02D 41/06* | (2006.01) |
| *F02D 41/38* | (2006.01) |

(52) U.S. Cl.
CPC ......... *F02D 19/024* (2013.01); *F02M 21/0212* (2013.01); *F02D 19/025* (2013.01); *F02M 21/029* (2013.01); *F02D 41/062* (2013.01); *F02D 17/02* (2013.01); *Y02T 10/32* (2013.01); *F02D 41/042* (2013.01); *F02D 19/027* (2013.01); *F02D 41/0027* (2013.01); *F02D 41/3863* (2013.01); *F02D 2250/02* (2013.01); *F02M 21/0245* (2013.01); *F02D 19/022* (2013.01)
USPC ........... 123/445; 123/41.2; 123/525; 123/541

(58) Field of Classification Search
CPC .................................................. F02D 2250/02
USPC ......... 123/179.17, 445, 456, 514, 541, 41.19, 123/41.2, 41.31, 525; 701/112, 113
See application file for complete search history.

(56) References Cited

U.S. PATENT DOCUMENTS

| | | | |
|---|---|---|---|
| 5,033,444 A | 7/1991 | Kaufman et al. | |
| 5,291,869 A * | 3/1994 | Bennett | 123/527 |
| 5,325,838 A * | 7/1994 | Bennett | 123/527 |
| 5,887,574 A | 3/1999 | Smith | |
| 6,155,235 A | 12/2000 | Kilgore | |
| 6,227,173 B1 * | 5/2001 | Bennett | 123/468 |
| 6,250,290 B1 * | 6/2001 | Mullen | 123/541 |
| 6,959,697 B2 * | 11/2005 | Kojima | 123/516 |
| 7,066,126 B2 * | 6/2006 | Tokuyasu et al. | 123/179.17 |

(Continued)

FOREIGN PATENT DOCUMENTS

| | | |
|---|---|---|
| GB | 2116254 A | 9/1983 |
| JP | 59018261 A | 1/1984 |

*Primary Examiner* — Thomas Moulis
*Assistant Examiner* — Elizabeth Hadley
(74) *Attorney, Agent, or Firm* — James Dottavio; Alleman Hall McCoy Russell & Tuttle LLP (57) ABSTRACT

In one example, a method for controlling a fuel system with fuel is provided. The method includes, in response to an engine shutdown, increasing communication between a fuel rail and a fuel tank to increase boiling of fuel in the rail, and then decreasing the communication after the fuel rail cools.

14 Claims, 6 Drawing Sheets

(56) References Cited

U.S. PATENT DOCUMENTS

| | | |
|---|---|---|
| 7,318,414 B2 | 1/2008 | Hou |
| 8,439,016 B2 * | 5/2013 | Carter ........................... 123/462 |
| 8,635,991 B2 * | 1/2014 | Pursifull ....................... 123/514 |
| 2002/0092505 A1 * | 7/2002 | Rembold et al. .............. 123/464 |
| 2005/0034710 A1 | 2/2005 | Crary et al. |
| 2006/0231078 A1 | 10/2006 | Barylski et al. |
| 2009/0120413 A1 | 5/2009 | Ramamurthy et al. |
| 2009/0271096 A1 * | 10/2009 | Matsubara ..................... 701/113 |
| 2010/0001503 A1 * | 1/2010 | Tanaka et al. ................. 280/807 |
| 2013/0238217 A1 * | 9/2013 | Nolan et al. ................... 701/102 |

* cited by examiner

LIQUID FUEL INJECTION ENGINE

RELATED APPLICATIONS

This application claims priority to Australian Patent Application No. 2010200354 entitled "Liquid Fuel Injection Engine," filed on Feb. 1, 2010, the entire contents of which being incorporated herein by reference.

BACKGROUND AND SUMMARY

Engines may use various fuels, including liquid propane gas (LPG) which may be a blend of liquid propane and butane. However, on any LPG injected engine, the liquid propane retained in the fuel rail after the engine is shut down can vaporize due to residual engine heat and pressure decay in the fuel lines. The vapor in the fuel lines can significantly displace the liquid, since vapor may occupy approximately 250 times the liquid volume in the case of propane. This displacement of liquid fuel within the fuel rails can degrade subsequent engine starts due to potentially incorrect fueling.

One approach to address this situation is to purge the vapor from the fuel lines during an engine start, but before injecting fuel to the engine. However, this can lead to unacceptably long crank times, for example as long as 9 seconds, as is the case in some vehicles that take this approach.

As such, in one approach, a method for controlling a fuel system with fuel is provided. The method comprises: in response to an engine shutdown, increasing communication between a fuel rail and a fuel tank to increase boiling of fuel in the rail, and then decreasing the communication after the fuel rail cools. In this way, it is possible to advantageously utilize engine soak heat to assist in cooling the fuel rail, while at the same time enabling improved vapor purging of the fuel rail. Note that the communication may be adjusted in a variety of ways, where increasing communication may include opening a solenoid valve, or increasing opening of a solenoid valve. As such, adjusting the communication may include adjusting a degree of communication.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
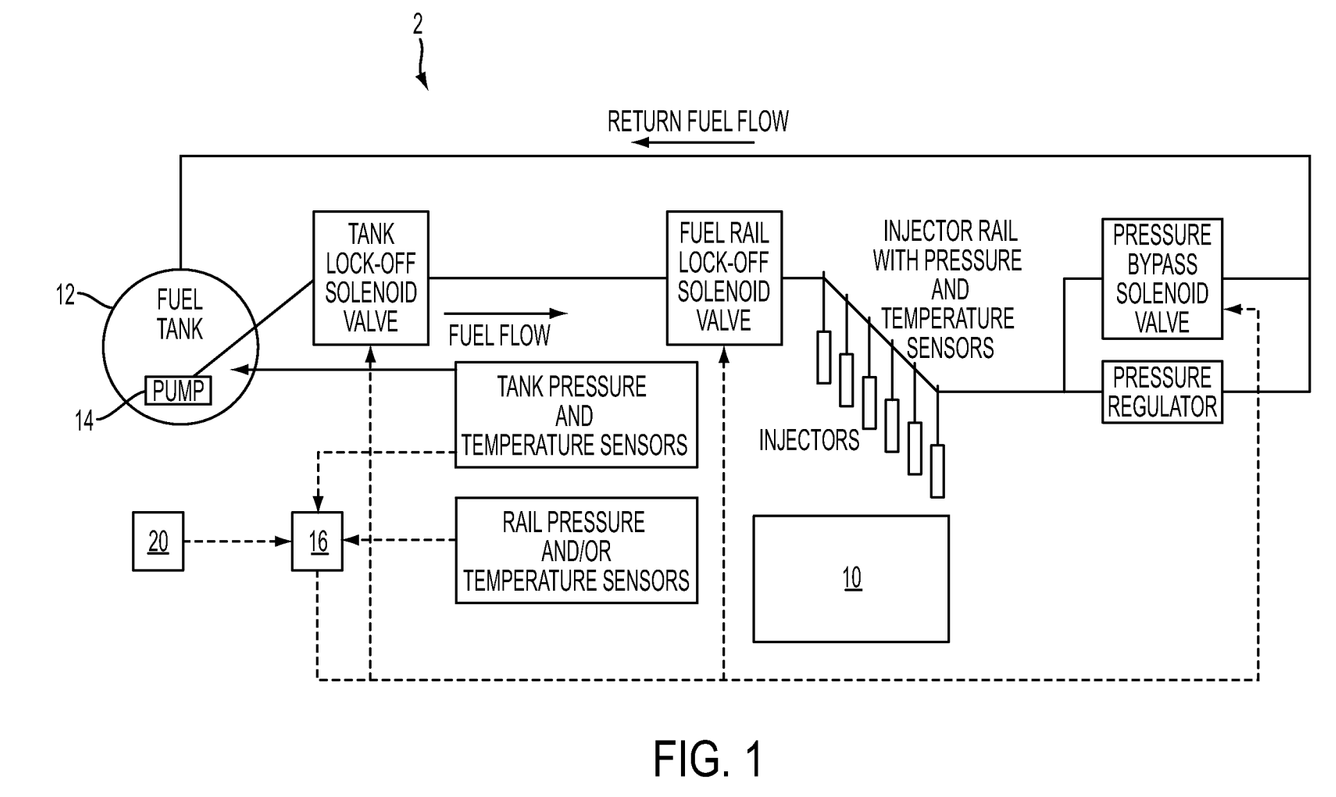
FIG. 1 shows a system diagram.

FIG. 1 shows an example fuel system for an engine 10 of a vehicle 2. In this example, a liquid propane (LPG) fuel injection system is shown including a fuel tank 12 enclosing a fuel pump 14, along with fuel and pressure sensors communicating with a controller 16, having computer readable storage medium thereon with code for receiving signals and sending control signals as described herein. Liquid fuel is pressured by the fuel pump and delivered to the fuel rail through a tank lock-off solenoid valve, and a fuel rail lock-off solenoid valve. Fuel in the fuel rail communicates with a plurality of fuel injectors coupled to the engine. Further, the fuel rail is coupled to a pressure regulator that regulates pressure in the injector fuel rail to maintain a specified pressure above tank pressure. If fuel rail pressure rises above the specified pressure, the regulator allows communication back to the fuel tank through a return flow line in order to reduce rail pressure. If rail pressure is below the specified pressure, the regulator blocks communication with the return flow line. An additional by-pass return line is provided via a pressure bypass solenoid valve and associated bypass line that also selectively allows communication between the fuel rail and the fuel tank via the return flow line.

As will be described herein, the bypass line may be opened at pressures below the specified pressure of the regulator to enable improved purging of vapors, such as during an engine start (e.g., during engine cranking before activating fuel injectors), if needed. Further, the bypass line may be opened at pressures below the specified pressure of the regulator to enable increased fuel boiling during/after an engine shutdown to more rapidly remove heat from the injectors and fuel rails and better cool the fuel system. For example, after an engine shutdown, the bypass solenoid valve may open (allowing communication from the fuel rail back to the fuel tank) to advantageously utilize the latent heat of vaporization of the fuel to cool the fuel rail, and then once the fuel is cooled below a threshold temperature, the bypass solenoid may close to build rail pressure to enable more fuel to be in a liquid state in the rail, even at elevated fuel temperatures.

Note that rather than a pressure regulator with the bypass solenoid, an alternative approach may include a high pressure variable flow solenoid valve instead. The solenoid valve may be adjusted to regulate pressure to a desired rail pressure after engine start-up and before engine shutdown. Likewise, during engine shutdown, the solenoid valve can be held open even at lower pressures to enable fuel boiling (heat adsorption), and further held open during cranking to purge vapors.

Continuing with FIG. 1, the system may further include a driver sensor 20 in or for a vehicle seat, which is coupled to an active seat restraint system that determines whether a driver or occupant is present in the driver's seat. For example, driver sensor 20 may include a seat sensor and/or a door sensor used to determine whether a driver or occupant is present in the driver's seat. The seat restraint system may be actuated by an occupant restraint actuator in response to the driver sensor. Additionally, the driver sensor may communicate with controller 16 for adjusting fuel system operation as described herein. As described below, the engine controller may utilize the driver sensor to activate continuous fuel priming to ensure that the engine will be ready to start when the driver is in the car, and thus reduce indiscriminate priming that would otherwise increase electrical loads unnecessarily and drive the requirement for a larger battery and alternator.

Figure 2:
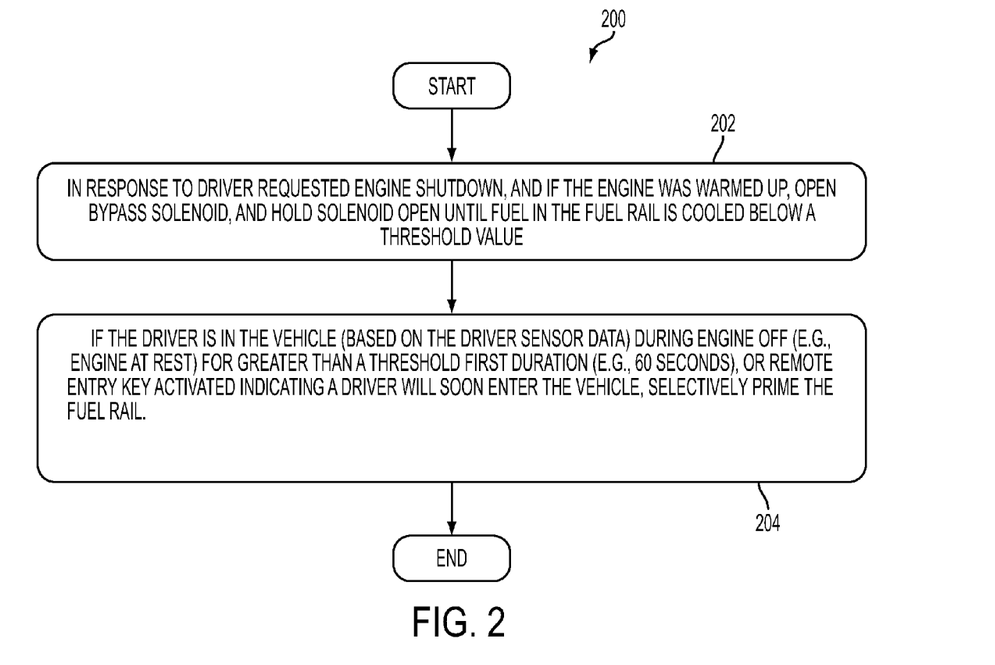
FIGS. 2-4 show high level routines of the system.
Figure 3:
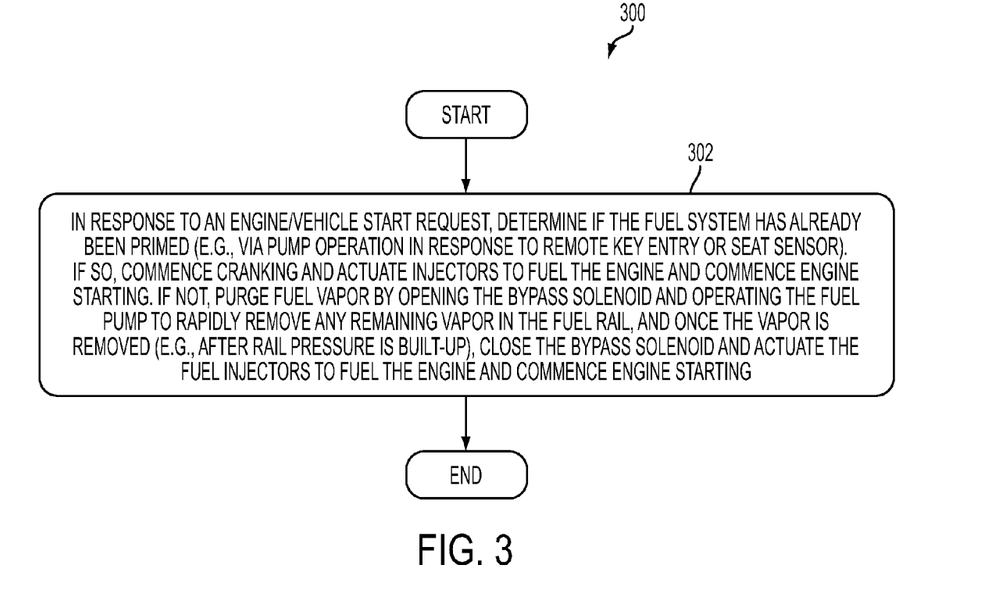
Figure 4:
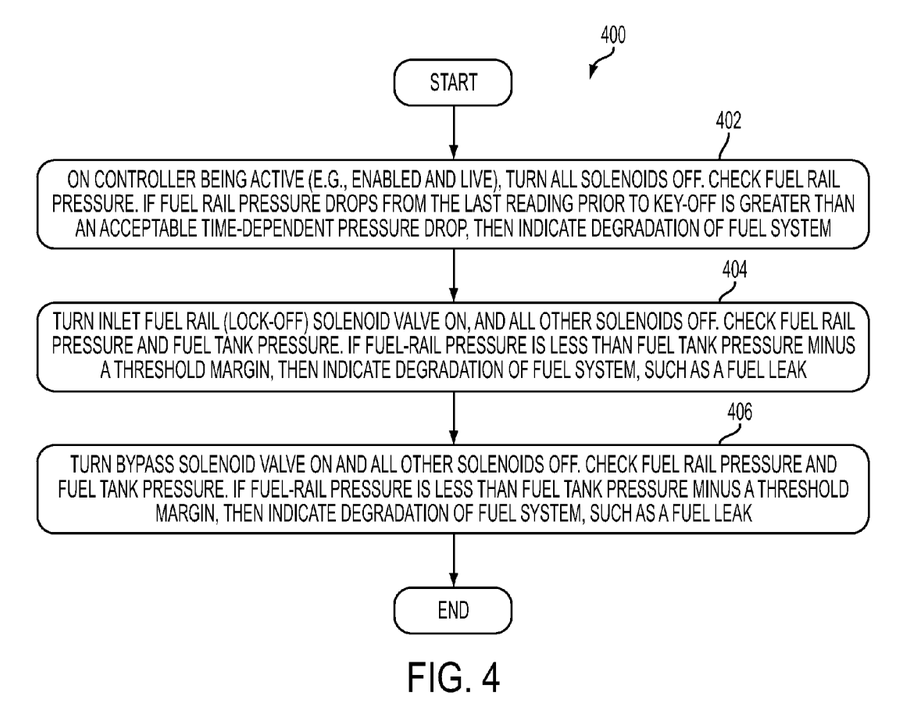

Referring now to FIGS. 2-4, various routines carried out by controller 16 are described. Although shown as flowcharts, the routines may be implemented as code or instructions programmed into a computer readable storage medium of controller 16.

FIG. 2 shows an example engine shutdown routine 200. At 202, in response to a driver requested engine shutdown and/or an automatic engine start-stop shutdown in response to automatic engine shutdown conditions (e.g., vehicle speed is zero and driver brake actuation is present), and if the engine was warmed up (e.g., engine coolant temperature was or is above a threshold temperature), the routine opens the bypass solenoid, and holds solenoid open until fuel in the fuel rail is cooled below a threshold value. The reduced fuel rail pressure with the regulator bypassed enables the fuel to boil more easily in the fuel rail to remove additional heat from the injectors and fuel rails to more rapidly cool the fuel system. This uses the latent heat of vaporization of the fuel to advantage. Thus, when the fuel is cooled below a threshold temperature, the bypass solenoid valve may be closed, and the fuel pump operated, to build-up rail pressure to enable the fuel to be in a liquid state in the fuel rail, even at elevated fuel soak temperatures. In this way, rapid engine starting, even during hot-restarts or cold engine starts, may be achieved.

Note that various approaches may be used to provide increased communication between the fuel rail and the fuel tank after the engine shutdown. While bypassing the regulator through a line downstream of the fuel pump is one approach, still another approach is to only partially bypass the regulator, or to adjust the regulator itself to increase opening of the regulator, as noted herein. In still another case, a bypass around the fuel pump may be opened.

At 204 in routine 200, if the driver is in the vehicle (e.g., based on the driver sensor data) during engine off (e.g., engine at rest) for greater than a threshold first duration (e.g., 60 seconds), or a remote entry condition occurs, e.g., a remote entry key is activated indicating a driver will soon enter the vehicle. In one example approach, in response to an occurrence of a remote entry condition, the routine opens the bypass solenoid valve and operates the fuel pump to continuously prime the fuel rail with liquid fuel and maintain the fuel rail pressure at or above the selected regulator pressure for a selected duration (e.g., 15 minutes), and then closes the by-pass valve once the rail is primed. For example, the routine may prime the fuel system with the solenoid bypass open for at least part of the priming operation to enable the liquid/vapor fuel to be pumped with minimal restrictions through the fuel rail to enhance fuel volume passing through the fuel rail. Further, in this way, the routine may operate the fuel pump during the engine shutdown (and/or engine rest) after boiling of the fuel to prime the fuel system, even before a key-on request to start the vehicle.

In another example approach, in response to an occurrence of a remote entry condition, the routine may selectively prime the fuel rail based on various engine and fuel rail operating parameters. For example, the routine may selectively prime the fuel rail depending on one or more of a temperature of the fuel rail, a pressure of the fuel rail, and a duration of a previous priming event of the fuel rail. For example, if a duration of a previous priming event is less than a threshold, then the priming may be carried out again before the current start. However, if the duration is greater than the threshold, the priming may be averted and the engine start may proceed without additional priming. In this way, fuel rail priming may only be performed as needed.

The reduced fuel rail pressure with the regulator bypassed enables the fuel to boil in the fuel rail to remove heat from the injectors and fuel rails to cool the system. Such an approach uses the latent heat of vaporization of the fuel to great effect. Once the fuel is cooled below a threshold, the solenoid valve is closed to build up rail pressure thereby enabling the fuel to be in a liquid state in the fuel rail, even at elevated fuel temperatures. Further, as described below with regard to FIG. 3, the solenoid may also be opened during engine cranking if any fuel vapors remain in the fuel rail. With the bypass solenoid open, vapor will be able to flow with less restriction through the bypass compared to liquid fuel thereby allowing more liquid propane to flow through the fuel rail when it is needed most during engine cranking. The line pressure will also be low when vapor passes through the bypass but increases sharply when liquid flows through it. Such an approach provides feedback (e.g., via the fuel rail pressure sensor) on when to cease the priming operation (and close the bypass) and allow the engine to be cranked.

Referring now specifically to FIG. 3, an example engine starting routine 300, is shown. At 302, in response to an engine/vehicle start request, the routine determines if the fuel system has already been primed (e.g., via pump operation in response to a remote key entry or driver sensor as described above with regard to FIG. 2). If so, the routine maintains closed or closes the bypass solenoid, commences cranking, and actuates injectors to fuel the engine and commence engine starting. If not, the routine purges fuel vapor by opening the bypass solenoid and operating the fuel pump to rapidly remove any remaining vapor in the fuel rail, and once the vapor is removed (e.g., after rail pressure begins to build-up), closes the bypass solenoid to further build pressure (if necessary) and actuate the fuel injectors to fuel the engine and commence engine starting. Such an approach enables the liquid/vapor fuel to be pumped with minimal restrictions through the fuel rail to enhance fuel volume passing through the fuel rail. Note that during an engine restart, whether the solenoid is opened or not may depend on whether all of the vapors were sufficiently purged during shutdown, and whether the rail was sufficiently primed during the shutdown. If so, the solenoid may remain closed during the start. Otherwise, the solenoid may be temporarily opened before fueling, to fully purge and prime the fuel rail, and then closed to enable increased pressure build-up and fueling of the engine.

Such a system thus allows fuel priming without the driver in vehicle, or with the driver in the vehicle but not yet turning a switch to a key-on and/or engine start position. However, due to such operation, additional diagnostics may be provided, such as shown in FIG. 4, to monitor that the fuel priming does not take place when the fuel system may be degraded, such as when there may be leaks in the system. For example fuel line communication may be adjusted during a diagnostic interval and degradation of the fuel system based on operating condition responses to the adjusting while a fuel pump is not in operation may be determined. As shown in routine 400 of FIG. 4, the controller may sequence the solenoids without pump operation and monitor parameters to identify potential degradation. Specifically, the following may be used, in the following sequence:

1. At 402, routine 400 includes the following: On the controller being live, turn all solenoids OFF. Check fuel rail pressure. If fuel rail pressure drop from last reading prior to KEY-OFF is greater than an acceptable time-dependent pressure drop, the degradation is identified.

2. At 404, routine 400 includes the following: Turn inlet fuel rail solenoid valve ON and all other solenoids OFF. Check fuel rail pressure and fuel tank pressure. If fuel-rail pressure is less than fuel tank pressure minus a margin, system degradation is identified.

3. At 406, routine 400 includes the following: Turn bypass solenoid valve ON and all other solenoids OFF. Check fuel rail pressure and fuel tank pressure. If fuel-rail pressure is less than fuel tank pressure minus a margin, system degradation is identified.

However, in an alternative approach, additional pressure sensors in the two fuel lines connecting the fuel tank to the engine may be provided, and these sensors monitored to identify degradation of the fuel system.

In this way, it may be possible to reduce engine cranking time. Specifically, rapidly cooling the fuel rail and injectors may be achieved by activating the bypass solenoid valve to bypass the fuel pressure regulator during the fuel priming process. Commencing the fuel prime operation prior to the driver entering the vehicle may be achieved by using the remote entry key signal to trigger the prime process. Further still, the system may accommodate for the case that the driver may already be in the vehicle waiting to go via a driver sensor to allow operation of the fuel pump to continually circulate cooler fuel through the fuel rails to keep the rails at optimum temperature and pressure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be encoded as microprocessor instructions and stored into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types and fuel types. The subject matter of the present disclosure includes all novel and nonobvious combinations and subcombinations of the various systems and configurations, and other features, functions, and/or properties disclosed herein.

Figure 5:
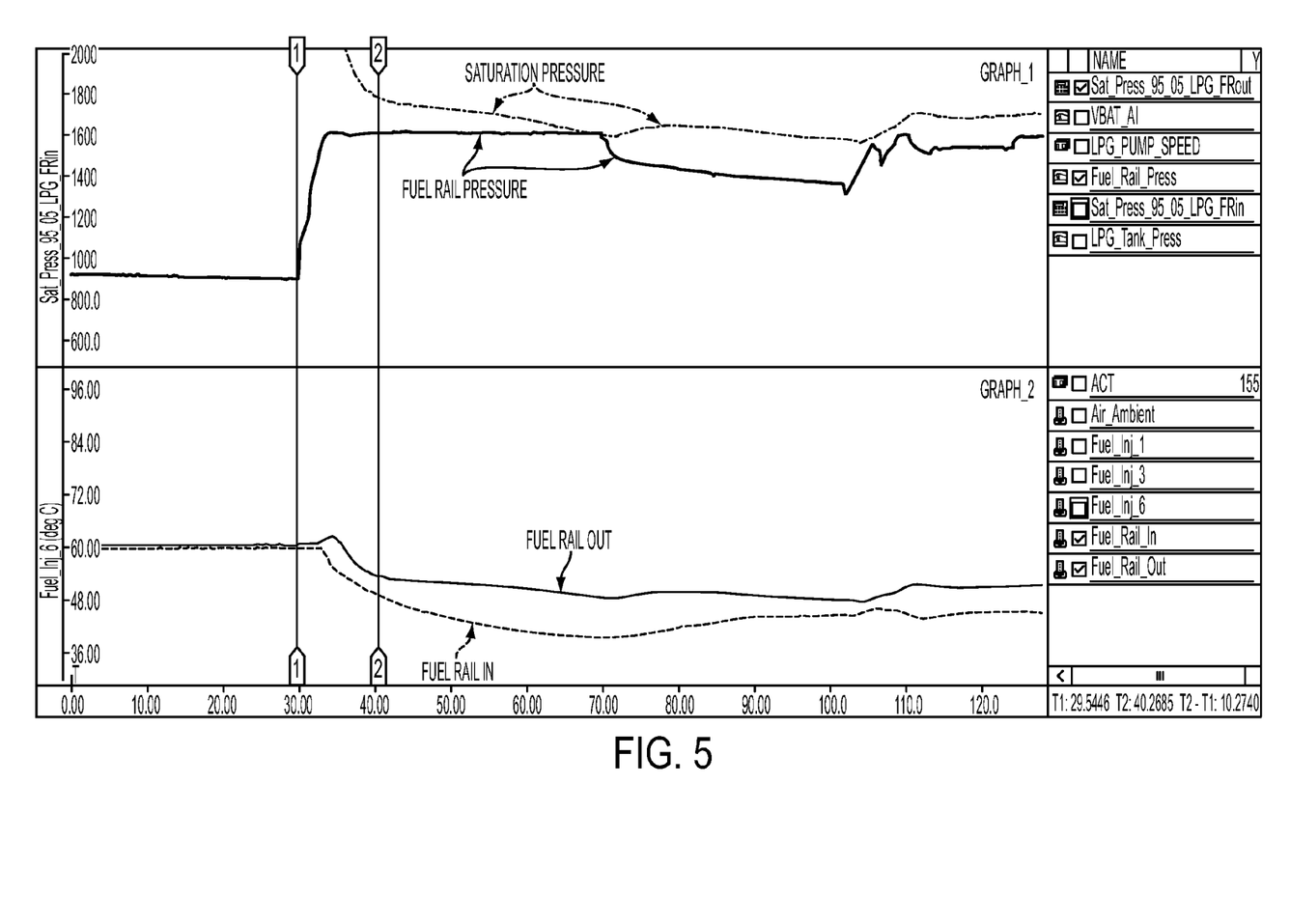
FIGS. 5-6 show example system performance for different configurations.

Referring now to FIG. 5, example data is shown for a system without the bypass operation. Specifically, FIG. 5 shows the purge operation with LPG fuel as a function of time (seconds). On the top traces, the fuel rail pressure trace rises when the pump operates to flow fuel into the fuel rail. The traces directly below shows the temperature of the fuel rail at the entry point (fuel rail in) and the exit point (fuel rail out) temperature falling with time. The fuel rail outlet temperature is consistently higher as the fuel is heated as it travels along the fuel rail. The saturation pressure of 95% propane LPG (saturation pressure) shows that the fuel is gassing (LPG saturation pressure exceeds fuel rail pressure) 40 seconds after the fuel pump operates.

Figure 6:
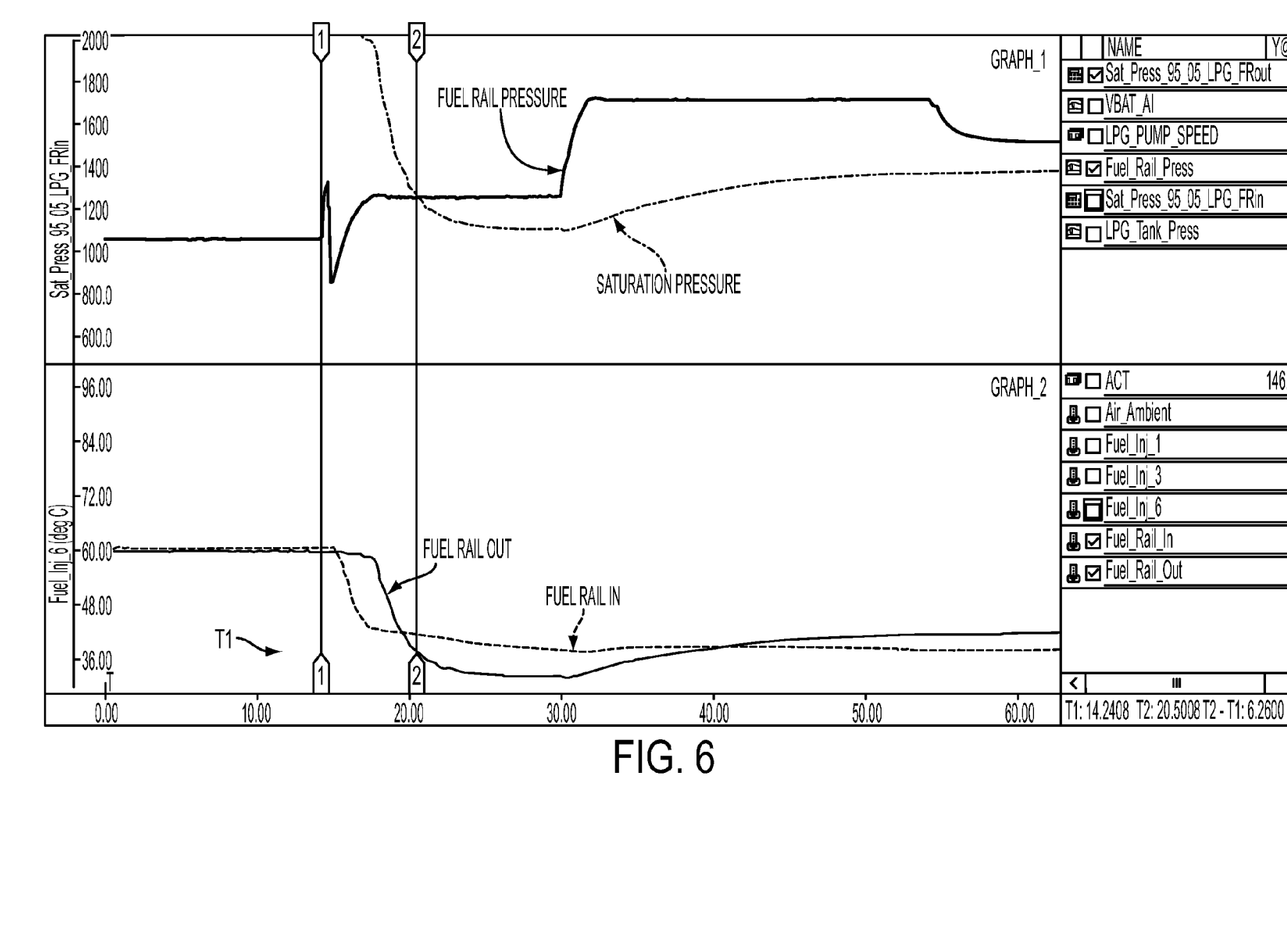

FIG. 6 shows example data with the bypass operating as described herein, with LPG fuel. Specifically, FIG. 3 shows an example purge operation. On the fuel rail pressure trace, the initial lower pressure due to the bypass solenoid operation is achieved. When the fuel is sufficiently cool, the bypass valve is closed, allowing the fuel rail pressure to build up to normal operating pressures. The bottom fuel rail temperatures show the rapid temperature drop compared to that of FIG. 5. Further, FIG. 6 illustrates the saturation pressure of 95% propane LPG, which shows that the fuel stops gassing 6.5 seconds after the fuel pump operates. Note that the pressure fluctuation at T1 is caused by the activation time effects of the fuel rail lock-off solenoid and bypass solenoid valve.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling a liquid propane fuel system with fuel in a vehicle, comprising:
   in response to an engine shutdown, sensing a temperature of a liquid propane fuel rail;
   in response to a fuel rail temperature that is above a threshold value, increasing communication between a fuel rail and a fuel tank to increase boiling of fuel in the fuel rail; and
   decreasing the communication when the fuel rail cools below a threshold value.

2. The method of claim 1 further comprising operating a fuel pump during the engine shutdown when the fuel rail cools below the threshold value and after boiling of the fuel to prime the fuel system before a key-on request to start the vehicle.

3. The method of claim 1 further comprising, upon engine start from the shutdown, selectively operating a fuel pump with the communication decreased and fueling the engine.

4. The method of claim 1 further comprising, upon engine start from the shutdown, selectively operating a fuel pump with the communication temporarily increased, and then decreased, and fueling the engine.

5. The method of claim 1 wherein the communication is provided during engine rest after the engine shutdown.

6. The method of claim 1 wherein the communication is provided by increasing an opening of a bypass solenoid coupled around a regulator valve, both the bypass solenoid and regulator valve coupled between the fuel rail and a fuel tank via a downstream return line from the fuel rail.

7. The method of claim 1 further comprising operating a fuel pump during or after the decreasing of communication and during the engine shutdown in response to a driver sensor.

8. The method of claim 7 further actuating an occupant restraint actuator in response to the driver sensor, the driver sensor including a door sensor.

9. The method of claim 1 further comprising operating a fuel pump during or after the decreasing of communication and during the engine shutdown in response to a remote entry condition.

10. The method of claim 1 further comprising adjusting the communication during a diagnostic interval, and determining degradation of the fuel system based on operating condition responses to the adjusting while a fuel pump is not in operation.

11. A method for controlling a liquid propane fuel system with fuel in a vehicle, comprising:
    in response to an engine shutdown and in response to a duration of a previous priming event and a remote entry request, selectively priming the engine before an engine start, including:
    increasing communication between a liquid propane fuel rail and a fuel tank to increase boiling of fuel in the fuel rail;
    sensing a temperature of the fuel rail; and
    decreasing the communication after the fuel rail cools and the sensed fuel rail temperature is below a threshold value.

12. The method of claim 11 wherein the priming is performed when a previous duration is less than a threshold, and priming is not performed when the previous duration is greater than the threshold.

13. The method of claim 12 wherein the priming includes operating a fuel pump during the engine shutdown or engine rest and after boiling of the fuel to prime the fuel system before a key-on request to start the vehicle.

14. The method of claim 13 further comprising, upon engine start from the shutdown or rest, selectively operating the fuel pump with the communication decreased and fueling the engine.

\* \* \* \* \*